(12) United States Patent
Vigilant

(10) Patent No.: US 11,385,893 B2
(45) Date of Patent: Jul. 12, 2022

(54) METHOD SECURED AGAINST SIDE-CHANNEL ATTACKS PERFORMING AN ARITHMETIC OPERATION OF A CRYPTOGRAPHIC ALGORITHM MIXING BOOLEAN AND ARITHMETIC OPERATIONS

(71) Applicant: THALES DIS FRANCE SA, Meudon (FR)

(72) Inventor: David Vigilant, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 17/048,262

(22) PCT Filed: Apr. 16, 2019

(86) PCT No.: PCT/EP2019/059836
§ 371 (c)(1),
(2) Date: Oct. 16, 2020

(87) PCT Pub. No.: WO2019/201944
PCT Pub. Date: Oct. 24, 2019

(65) Prior Publication Data
US 2021/0157586 A1    May 27, 2021

(30) Foreign Application Priority Data
Apr. 17, 2018    (EP) .................................... 18305471

(51) Int. Cl.
*G06F 9/30* (2018.01)
*H04L 9/00* (2022.01)
*H04L 9/06* (2006.01)

(52) U.S. Cl.
CPC ........ *G06F 9/30029* (2013.01); *G06F 9/3001* (2013.01); *H04L 9/002* (2013.01); *H04L 9/0643* (2013.01)

(58) Field of Classification Search
None
See application file for complete search history.

(56) References Cited

U.S. PATENT DOCUMENTS 8,050,402 B2 * 11/2011 Golic ..................... G06F 7/764
380/28
8,553,877 B2 * 10/2013 Scian .................... H04L 9/0631
380/28

(Continued)

FOREIGN PATENT DOCUMENTS

WO    WO-2008064704 A1 *    6/2008    ............. H04L 9/003

OTHER PUBLICATIONS

Fukushima, K., et al., Fault Injection Attack on Salsa20 and ChaCha and a Lightweight Countermeasure, 2017, IEEE, pp. 1032-1037. (Year: 2017).*

(Continued)

*Primary Examiner* — Eric Coleman
(74) *Attorney, Agent, or Firm* — The Jansson Firm; Pehr B. Jansson

(57) ABSTRACT

The present invention relates to a method secured against side channel attacks performing an arithmetic operation of a cryptographic algorithm mixing Boolean and arithmetic operations, wherein said method is performed by a cryptographic device comprising a processing system having at least one hardware processor, and said operation has a first value (x) and a second value (y) as operands, comprising: —obtaining (S1) a first masked value (x'), a second masked value (y'), a first Boolean mask ($r_x$), a second Boolean mask ($r_y$), said first masked value (x') resulting from masking said first value (x) by said first Boolean mask ($r_x$) by performing a Boolean exclusive OR (XOR) operation between said first value (x) and said first Boolean mask ($r_x$), and said second (Continued)

masked value (y') resulting from masking said second value (y) by said second Boolean mask ($r_y$) by performing a Boolean exclusive OR (XOR) operation between said second value (y) and said second Boolean mask ($r_y$), —performing (S2) in any order a plurality of computing steps combining values among said first masked value (x'), said second masked value (y'), said first Boolean mask ($r_x$) and said second Boolean mask ($r_y$) to obtain a boolean masked result equal to the result of the arithmetic operation having said first value (x) and said second value (y) as operands, masked by a third boolean mask ($r_x$ xor $r_y$) resulting from performing said Boolean exclusive OR (XOR) operation between said first Boolean mask ($r_x$) and said second Boolean mask ($r_y$) ((x+y) xor ($r_x$ xor $r_y$)), wherein said computing steps perform Boolean exclusive OR (XOR) operations or arithmetic operations between said values without disclosing any information relative to the first and second values and, wherein said computing steps are executed by the hardware processor by performing a constant number of elementary operations whatever the bit-size of said first and second values, —outputting (S3) said boolean masked result of the arithmetic operation between said first value (x) and said second value (y).

27 Claims, 3 Drawing Sheets

(56) References Cited

U.S. PATENT DOCUMENTS

| | | | | |
|---|---|---|---|---|
| 8,681,985 | B2 * | 3/2014 | Choi | H04L 9/0631 |
| | | | | 380/259 |
| 9,166,789 | B2 * | 10/2015 | Ikeda | G09C 1/00 |
| 10,333,699 | B1 * | 6/2019 | Rohatgi | H04L 9/0662 |
| 10,505,711 | B2 * | 12/2019 | Thiebeauld de La Crouee | ......... |
| | | | | G09C 1/00 |
| 10,699,030 | B2 * | 6/2020 | Cooper | G06F 21/75 |
| 10,871,947 | B2 * | 12/2020 | Hutter | G09C 1/00 |
| 2005/0232430 | A1 * | 10/2005 | Gebotys | H04L 9/003 |
| | | | | 380/286 |
| 2015/0110266 | A1 * | 4/2015 | Debraize | H04L 9/3242 |
| | | | | 380/30 |
| 2018/0183576 | A1 * | 6/2018 | Wang | G06F 7/588 |

OTHER PUBLICATIONS

Fischer, W. et.al., Cryptographic Hardware and Embedded Systems Ches 2017, 2017, Springer, pp. 3-154. (Year: 2017).*
Leander, G., Fast Software Encrpytion, 2015, Springer, pp. 3-175. (Year: 2015).*
PCT/EP2019/059836, International Search Report, dated May 2, 2019, European Patent Office, P.B.5818 Patentlaan 2 NL—2280 HV Rijswijk.
Mohamet Karroumi et al: "Addition with Blinded Operands", Constructive Side-Channel Analysis and Secure Design (COSADE 2014), Apr. 14, 2014, XP055506390, Cham ISBN: 978-3-319-10175-0 Retrieved from the Internet: URL: http://Link.Springer.com/10.1007/978-3-319-10175-0 [retrieved on Sep. 12, 2018].
Coron J-S et al: "A New Algorithm for Switching from Arithmetic to Boolean Masking", Electronic Publishing, Artistic Imaging, and Digital Typography; [Lecture Notes in Computer Science, ISSN 0302-9743], Springer Verlag, DE, vol. 2779, Jan. 1, 2003, pp. 89-97, XP002340677, ISBN: 978-3-540-24128-7 p. 91, line 26-p. 92, line 9.
PCT/EP2019/059836, Written Opinion of the International Searching Authority, dated May 2, 2019, European Patent Office, D-80298 Munich.

* cited by examiner

METHOD SECURED AGAINST SIDE-CHANNEL ATTACKS PERFORMING AN ARITHMETIC OPERATION OF A CRYPTOGRAPHIC ALGORITHM MIXING BOOLEAN AND ARITHMETIC OPERATIONS

FIELD OF THE INVENTION

The present invention relates to the field of cryptographic methods and devices protected against side channel analysis, and more particularly to protecting against side-channel attacks a cryptographic algorithm mixing Boolean and arithmetic operations.

BACKGROUND OF THE INVENTION

Cryptographic algorithms are commonly used for ensuring the privacy of communications by encryption, for authentication or for generating a verifiable signature. Such cryptographic algorithms are sensitive to side-channel attacks, based on an analysis of the power consumption or electromagnetic signature of the device performing the encryption.

A commonly used countermeasure against side-channel attacks is the masking of the intermediate values of an encryption process with a random mask. In that case, an attacker performing a side-channel attack at a given point of the encryption process would only get random values and would not obtain any information on the secret key used for the cryptographic process.

Some cryptographic algorithms may mix Boolean and arithmetic operations such as MD5 or SHA hash functions or some block cipher algorithms. Since arithmetic operations and Boolean operations are not commutative, arithmetic masking and Boolean masking are not compatible and keeping all intermediate results of such algorithms masked may prove difficult: obtaining a masked result of an arithmetic operation between two values requires more than just performing said arithmetic operation on these two values masked by Boolean masks.

A first way to deal with such an issue is to perform conversion between Arithmetic and Boolean masking when needed for having intermediate values masked using the kind of masking compatible with the next operation to be performed. Such an approach was proposed for example in L. Goubin "*A sound method for switching between Boolean and Arithmetic masking*". The main drawback of such an approach is its cost for performing Arithmetic to Boolean masking, which depends linearly on the size of the values and masks to be handled. The method was improved using precomputation of tables, such as in J. S. Coron, A. Tchulkine "*A new algorithm for switching from arithmetic to boolean masking*". Nevertheless, the global computation time of such a method still strongly depends on the values and masks to be handled.

Another approach was proposed in EP2884387B1, in which operands of an arithmetic operation to be performed are redefined in order to accept as input values masked using a Boolean mask and to output the result of this arithmetic operation applied to the corresponding unmasked input values, masked by another Boolean mask. Nevertheless, the proposed algorithm also requires for defining such an operator a number of operations linearly depending on the size of the input values and of the masks to be processed.

As a result, there is a need for a method enabling to perform an arithmetic operation on values masked by Boolean masks and requiring to perform a reduced number of operations.

SUMMARY OF THE INVENTION

For this purpose and according to a first aspect, this invention therefore relates to a method secured against side channel attacks performing an arithmetic operation of a cryptographic algorithm mixing Boolean and arithmetic operations, wherein said method is performed by a cryptographic device comprising a processing system having at least one hardware processor, and said operation has a first value and a second value as operands, comprising:

obtaining a first masked value, a second masked value, a first Boolean mask, a second Boolean mask, said first masked value resulting from masking said first value by said first Boolean mask by performing a Boolean exclusive OR (XOR) operation between said first value and said first Boolean mask, and said second masked value resulting from masking said second value by said second Boolean mask by performing a Boolean exclusive OR (XOR) operation between said second value and said second Boolean mask, performing in any order a plurality of computing steps combining values among said first masked value, said second masked value, said first Boolean mask and said second Boolean mask to obtain a boolean masked result equal to the result of the arithmetic operation having said first value and said second value as operands, masked by a third boolean mask resulting from performing said Boolean exclusive OR (XOR) operation between said first Boolean mask and said second Boolean mask, wherein said computing steps perform Boolean exclusive OR (XOR) operations or arithmetic operations between said values without disclosing any information relative to the first and second values and, wherein said computing steps are executed by the hardware processor by performing a constant number of elementary operations whatever the bit-size of said first and second values, outputting said boolean masked result of the arithmetic operation between said first value and said second value.

Each computing step may combine a plurality of values among: said first masked value, said second masked value, said first value masked by said second Boolean mask, said second value masked by said first Boolean mask, said first value masked with said second masked value as Boolean mask, said second value masked with said first masked value as Boolean mask, said first boolean mask, and said second boolean mask.

According to a first embodiment, said computing steps comprise:

a first computing step computing a first intermediate value A from said first masked value x', said second boolean mask $r_y$, said second masked value y' and said first boolean mask $r_x$ such that $A=(x' \text{ xor } r_y)+(y' \text{ xor } r_x)$, a second computing step computing a second intermediate value B from said first masked value x', said second masked value y', said first boolean mask $r_x$, and said second boolean mask $r_y$ such that $B=(x'$ xor $y')+(r_x$ xor $r_y)$, a third computing step computing a third intermediate value C from said first masked value x', said second masked value y' such that C=x' xor y', a fourth computing step computing said boolean masked result of the arithmetic operation between said first value (x) and said second value (y) by performing said boolean exclusive OR (XOR) operation between said first, second, and third intermediate values (A xor B xor C), wherein "+" is an arithmetic operation among an addition or a subtraction modulo $2^k$ with k an integer, and "xor" is said boolean exclusive OR operation.

According to a second embodiment, said computing steps comprise:

a first computing step computing a first intermediate value A from said first boolean mask $r_x$, and said second value y masked with said first masked value x' as Boolean mask such that $A=r_x+(y$ xor $x')$, a second computing step computing a second intermediate value B from said first masked value x' and said second value y masked by said first Boolean mask $r_x$ such that $B=x'+(y$ xor $r_x)$, a third computing step computing a third intermediate value C from said first masked value x' and said second masked value y' such that C=x' xor y', a fourth computing step computing said boolean masked result of the arithmetic operation between said first value x and said second value y by performing said boolean exclusive OR operation between said first, second, and third intermediate values (A xor B xor C), wherein "+" is an arithmetic operation among an addition or a subtraction modulo $2^k$ with k an integer, and "xor" is said boolean exclusive OR operation.

According to a third embodiment, said computing steps comprise:

a first computing step computing a first intermediate value A from said second boolean mask $r_y$ and said first value x masked with said second masked value y' as Boolean mask such that $A=r_y+(x$ xor $y')$, a second computing step computing a second intermediate value B from said second masked value y' and said first value x masked by said second Boolean mask $r_y$ such that $B=y'+(x$ xor $r_y)$, a third computing step computing a third intermediate value C from said first masked value x' and said second masked value y' such that C=x' xor y', a fourth computing step computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a subtraction modulo $2^k$ with k an integer, and "xor" is said Boolean exclusive OR operation.

Such methods enable to perform said arithmetic operation on values masked by Boolean masks in a number of elementary operations that does not depend on the size of the operands of the operation, while keeping at all times all intermediate values and result values masked and therefore protected against a side channel attack.

Such methods may comprise blinding two values among the first, second and third intermediate values computed during said first, second and third computing steps using a random value.

Such an additional blinding enables to increase even more the protection of the method against side channel analysis.

The step of blinding an intermediate value may comprise:

arithmetically masking said intermediate value by performing an arithmetic operation with said random value, and performing an arithmetic masking to boolean masking conversion of said arithmetically masked intermediate value into a Boolean masked intermediate value masked by the random value using a precomputed table.

The cryptographic algorithm may perform functions among a hash function, a block cipher and a stream cipher.

The hash function may be among MD5, SHA1, SHA256, SHA512, Skein functions, the block cipher may be among XTEA, FEAL, SPECK, Threefish functions and/or the stream cipher may be among Salsa20, ChaCha functions.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a non-transitory computer readable medium storing executable computer code that when executed by a cryptographic device comprising a processing system having at least one hardware processor performs the methods according to the first aspect.

According to a fourth aspect, this invention therefore relates also to a cryptographic device comprising:

a processing system having at least one hardware processor (201) configured to perform the methods according to the first aspect, at least one memory for storing the first and second masked values and the results of the calculations performed during the different computing steps.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at providing a method performing an arithmetic operation of a cryptographic algorithm mixing Boolean and arithmetic operations, in a way that is secured against side channel attacks. This cryptographic algorithm may perform functions comprising both types of operations, such as a hash function, like MD5, SHA1, SHA256, SHA512 or Skein functions, a block cipher like XTEA, FEAL, SPECK (https://eprint.iacr.org/2013/404.pdf) or Threefish functions, or a stream cipher like Salsa20 or ChaCha functions.

Figure 1:
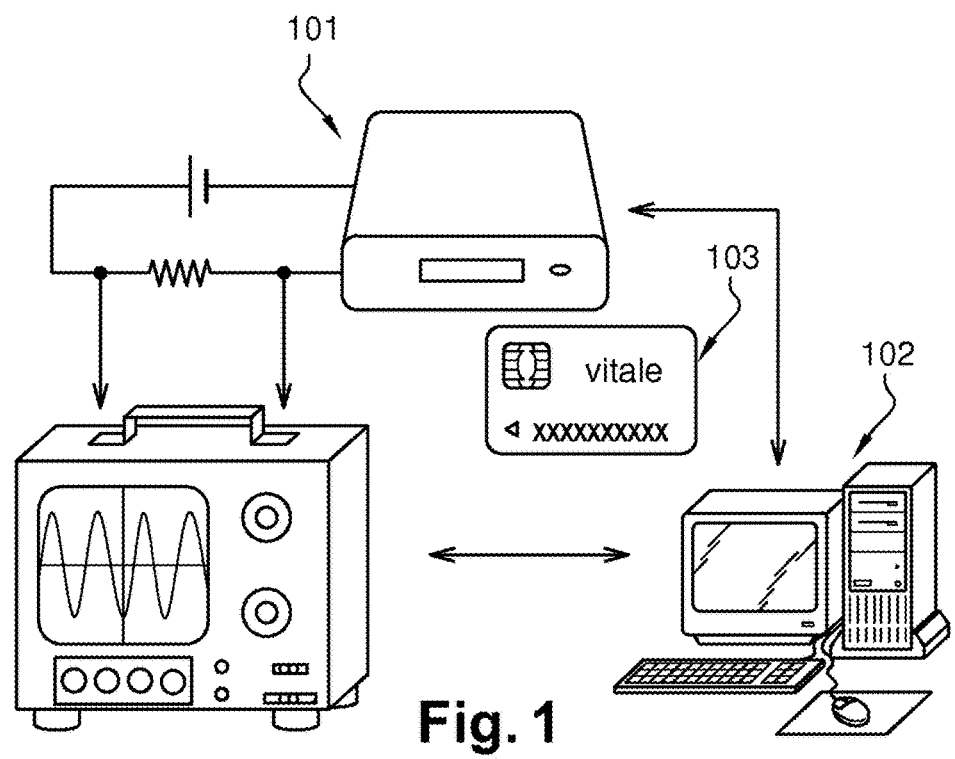
FIG. 1 is a schematic illustration of a system according to an embodiment of the present invention.

As depicted on FIG. 1, this method, and possibly the other steps of the cryptographic algorithm, is performed by a cryptographic device 101. Such a cryptographic device 101 may be connected to a personal computer or server 102 operated by a user and sending commands to the cryptographic device for cryptographic operations such as data encryption or decryption. Alternatively, the cryptographic device 101 may be embedded in the computer 102.

The cryptographic device 101 may include or be a tamper resistant device 103 secured against any unauthorized access including a processing system having at least one hardware processor for performing cryptographic operations, and at least one memory configured for storing the data needed for such operations, such as operands, intermediate results, mask values . . . . Such a cryptographic device may for example be a smartcard reader housing a smartcard device, or an electronic device, such as a smartphone, including an embedded smartchip.

Figure 2:
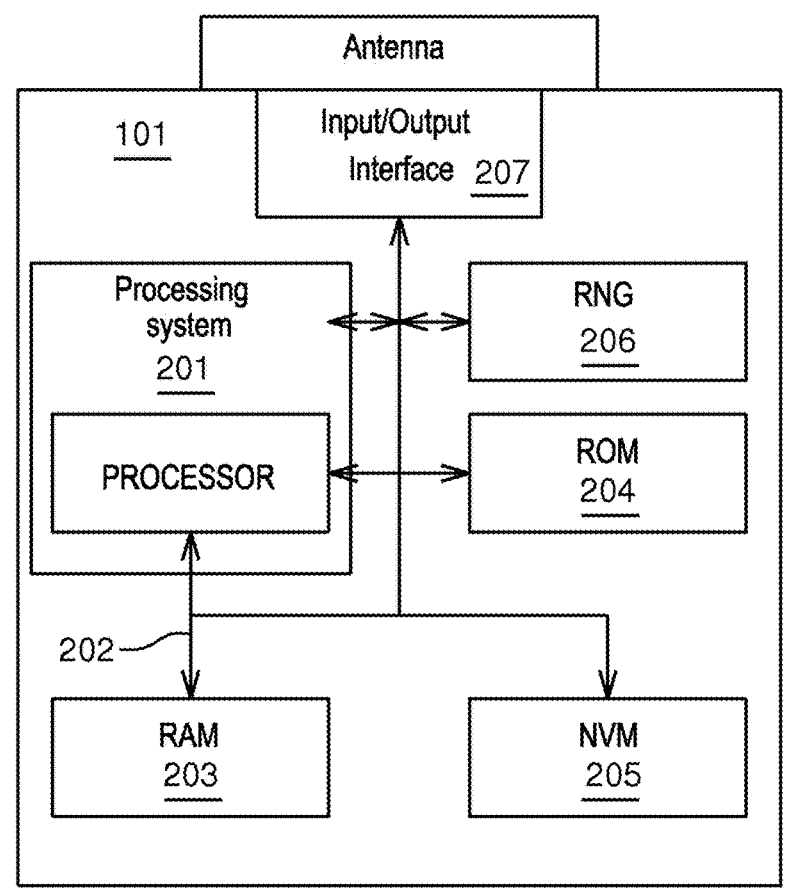
FIG. 2 is a schematic illustration of a cryptographic device according to an embodiment of the present invention.

As depicted on FIG. 2, the cryptographic device 101 may include a processing system 201 having at least one hardware processor, connected via a bus 202 to a computer readable memory circuit including a random access memory (RAM) 203, a read-only memory (ROM) 204, and/or a non-volatile memory (NVM) 205. The cryptographic device 101 may also include a random number generator (RNG) 206, included in the hardware processor or connected to it via the bus. The cryptographic device 101 may further include an interface 207 used to connect the cryptographic device 101 to the computer 102. Such an interface may be either a wired interface such as a USB, Ethernet or Thunderbolt interface, or a wireless interface, such as a Bluetooth interface. The interface 207 may also be used to connect the cryptographic device 101 to a wireless network, e.g., wide-area networks, WiFi networks, or mobile telephony networks through which communication may be performed with the computer 102.

Figure 3:
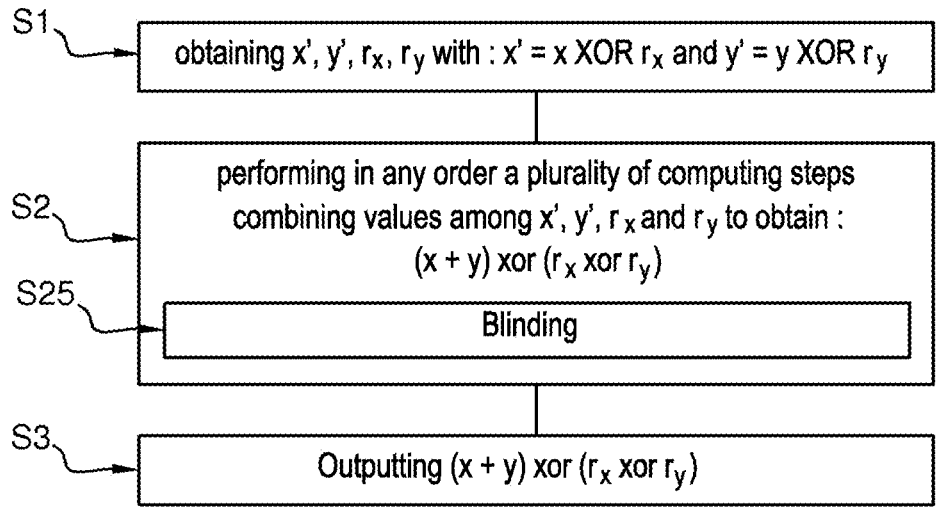
FIGS. 3, 3*a*, 3*b*, 3*c* illustrate schematically a method according the present invention and several embodiments of the present invention.

The following paragraphs describe, as depicted on FIG. 3, the steps of a method secured against side channel attacks and performing an arithmetic operation of the cryptographic algorithm mixing Boolean and arithmetic operations, performed by the cryptographic device 101 according to a first aspect of the invention.

Such an operation may for example be an addition or an subtraction modulo $2^k$ with $k>=1$ an integer, for example equal to 8, 16, 32 or 64. It is performed between a first value x and a second value y as operands, said operands having a bit-size equal to k. For simplicity, in the formula given in the next paragraphs, the "+" sign will be used to represent said arithmetic operation and the "modulo $2^k$" will be omitted. This means that the aim of the method is to compute the result of the arithmetic operation having said first value x and said second value y as operands, for example x+y. In order to keep the result secured against side channel analysis, it shall be provided under a masked state.

The method according to the invention is designed to be used when an arithmetic operation shall be performed after a Boolean operation of the cryptographic algorithm mixing Boolean and arithmetic operations has been performed and has outputted values masked by Boolean masks. Therefore, during a first step S1, the cryptographic device 101 shall obtain the operands of the operation x and y, masked by Boolean masks.

In the following paragraphs, the expression "value masked by a Boolean mask" or "boolean masked value" is used to describe the result of performing a Boolean operation, such as a Boolean exclusive OR operation, XOR, between the value to be masked and another value to be used as mask. In that case, the value to be used as mask is called a Boolean mask. For example, masking a value v by a Boolean mask m produces a Boolean masked value v xor m.

Similarly, the expression "masked by an arithmetic mask" is used to describe the result of performing an arithmetic operation, noted by the sign "+" as mentioned here above, such as an addition or subtraction, between a value to be masked and another value to be used as mask. In that case, the value to be used as mask is called an arithmetic mask. For example, masking a value v by an arithmetic mask n produces a masked value v+n.

During the first step S1, the cryptographic device 101 shall obtain:

a first Boolean masked value x', then called first masked value, resulting from masking the first value x by a first Boolean mask $r_x$, by performing a Boolean exclusive OR, XOR, operation between the first value x and the first Boolean mask $r_x$: x'=x XOR $r_x$, a second Boolean masked value y', then called second masked value, resulting from masking the second value y by the second Boolean mask $r_y$, by performing a Boolean exclusive OR, XOR, operation between the second value y and the second Boolean mask $r_y$: y'=y XOR $r_y$, the first Boolean mask $r_x$ and the second Boolean mask $r_y$. Such values may for example be read from the RAM 203, the ROM 204, and/or the NVM 205 of the cryptographic device 101.

Then, during a second step S2, the cryptographic device may perform in any order a plurality of computing steps combining values among the first masked value x', the second masked value y', the first Boolean mask $r_x$ and the second Boolean mask $r_y$ to obtain a boolean masked result equal to the result of the arithmetic operation having the first value x and the second value y as operands, masked by a third boolean mask $r_x$ xor $r_y$ resulting from performing a XOR operation between the first Boolean mask $r_x$ and the second Boolean mask $r_y$. Said differently, such computing steps compute the value (x+y) xor ($r_x$ xor $r_y$).

These computing steps perform XOR operations or arithmetic operations between said combined values without disclosing any information relative to the first and second values x and y, which means that they manipulate masked values only.

These computing steps are executed by the hardware processor of the cryptographic device by performing a constant number of elementary operations whatever the bit-size of the first and second values x and y.

Performing an elementary operation, such as a "+" or a XOR operation, may require performing one or more basic CPU instructions, depending on the number of basic CPU instructions required for applying the operation to operands of a given bit-size, which itself depends on the size of the registers and the buses of the hardware processor. For example a 32-bit processor may need only one basic instruction for performing an elementary operation on operands of a size up to 32 bits; but it may require at least two basic instructions for performing the same elementary operation on operands of a bigger size.

Consequently, assuming that a X-bit processor needs only Y basic instruction for performing an elementary operation on operands of a size up to Y*X bits, these computing steps may be executed by the hardware processor of the cryptographic device by performing a first constant number of elementary operations when operands x and y have a bit-size lower or equal than the size of the registers and the buses of the hardware processor; they may be executed by the hardware processor of the cryptographic device by performing a second constant number of elementary operations when operands x and y have a bit-size between this registers/buses size and twice that size; and so on . . . .

Then, during a third step S3, the cryptographic device outputs said boolean masked result of the arithmetic operation between said first value x and said second value y. This boolean masked result is equal to (x+y) xor ($r_x$ xor $r_y$).

During the second step S2, in order to compute said Boolean masked result, the cryptographic device may combine, at each computing step, a plurality of values among the first masked value x', the second masked value y', the first value x masked by the second Boolean mask $r_y$, the second value y masked by the first Boolean mask $r_x$, the first value x masked by the second masked value y' as Boolean mask, the second value y masked by the first masked value x' as Boolean mask, the first boolean mask $r_x$, and the second boolean mask $r_y$.

Figure 3A:
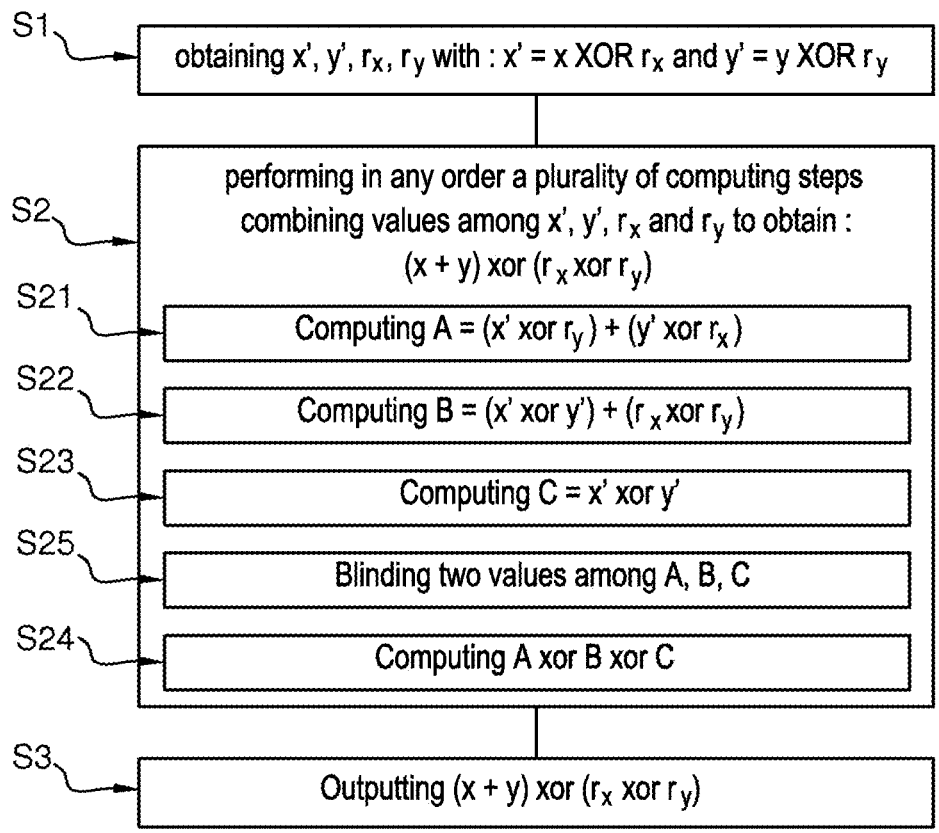

In a first embodiment, as depicted on FIG. 3a, the second step S2 comprises:
- a first computing step S21 during which the cryptographic device computes a first intermediate value A from said first masked value x', said second boolean mask $r_y$, said second masked value y' and said first boolean mask $r_x$ such that A=(x' xor $r_y$)+(y' xor $r_x$),
- a second computing step S22 during which the cryptographic device computes a second intermediate value B from said first masked value x', said second masked value y', said first boolean mask $r_x$, and said second boolean mask $r_y$ such that B=(x' xor y')+($r_x$ xor $r_y$),
- a third computing step S23 during which the cryptographic device computes a third intermediate value C from said first masked value x', said second masked value y' such that C=x' xor y',
- a fourth computing step S24 during which the cryptographic device computes said boolean masked result of the arithmetic operation between said first value x and said second value y by performing said XOR operation between said first, second, and third intermediate values. Said differently, the cryptographic device computes A xor B xor C which is equal to (x+y) xor ($r_x$ xor $r_y$).

In this first embodiment, the Boolean masked result (x+y) xor ($r_x$ xor $r_y$) is computed, from the values obtained during the first step S1, by performing only nine elementary operations (7 XOR and 2 arithmetic operations), whatever the bit-size of the first and second values, x and y, may be.

Figure 3B:
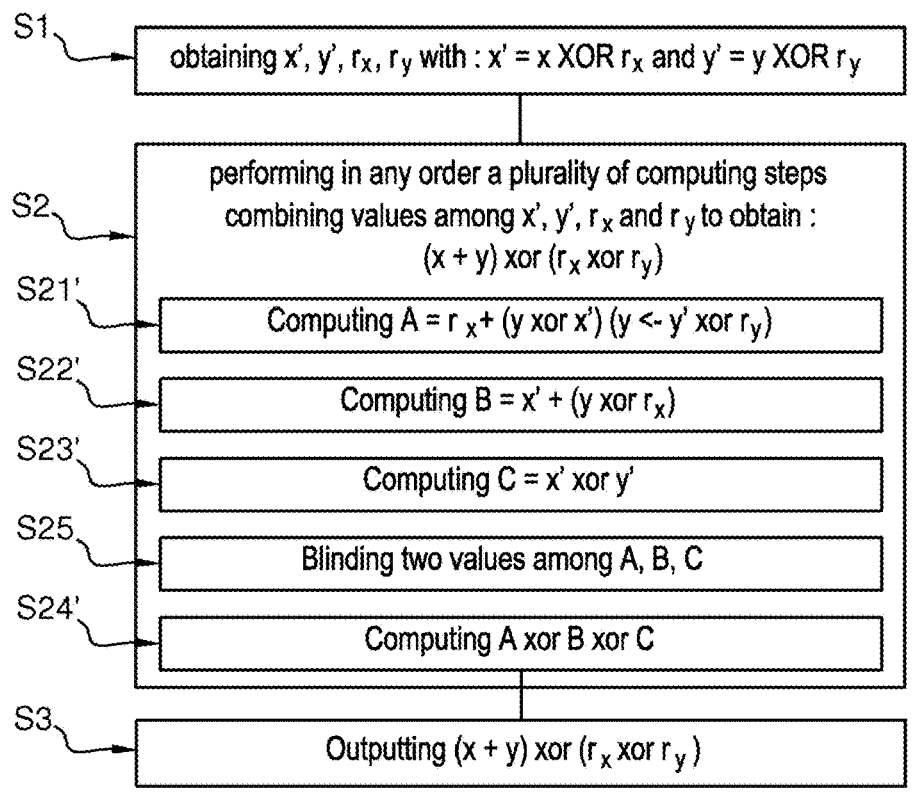

In a second embodiment, as depicted on FIG. 3b, the second step S2 comprises:
- a first computing step S21' during which the cryptographic device computes a first intermediate value A from said first boolean mask $r_x$, and said second value y masked by said first masked value x' as Boolean mask such that A=$r_x$+(y xor x'),
- a second computing step S22' during which the cryptographic device computes a second intermediate value B from said first masked value x' and said second value y masked by said first Boolean mask $r_x$ such that B=x'+(y xor $r_x$),
- a third computing step S23' during which the cryptographic device computes a third intermediate value C from said first masked value x' and said second masked value y' such that C=x' xor y',
- a fourth computing step S24' during which the cryptographic device computes said boolean masked result of the arithmetic operation between said first value x and said second value y by performing a XOR operation between the first, second, and third intermediate values. Said differently, the cryptographic device computes A xor B xor C which is equal to (x+y) xor ($r_x$ xor $r_y$).

In order to avoid manipulating the second value y unmasked, it may be replaced in the formula above by y' xor $r_y$. In order to avoid computing the unmasked second value y at any time, computations may be performed in the following order during the first computing step S21': A=$r_x$+((y' xor x') xor $r_y$) and during the second computing step S22': B=x'+((y' xor $r_x$) xor $r_y$). In that case, in this second embodiment, the Boolean masked result (x+y) xor ($r_x$ xor $r_y$) is also computed, from the values obtained during the first step S1, by performing only nine elementary operations (7 XOR and 2 arithmetic operations), whatever the bit-size of the first and second values, x and y, may be.

Figure 3C:
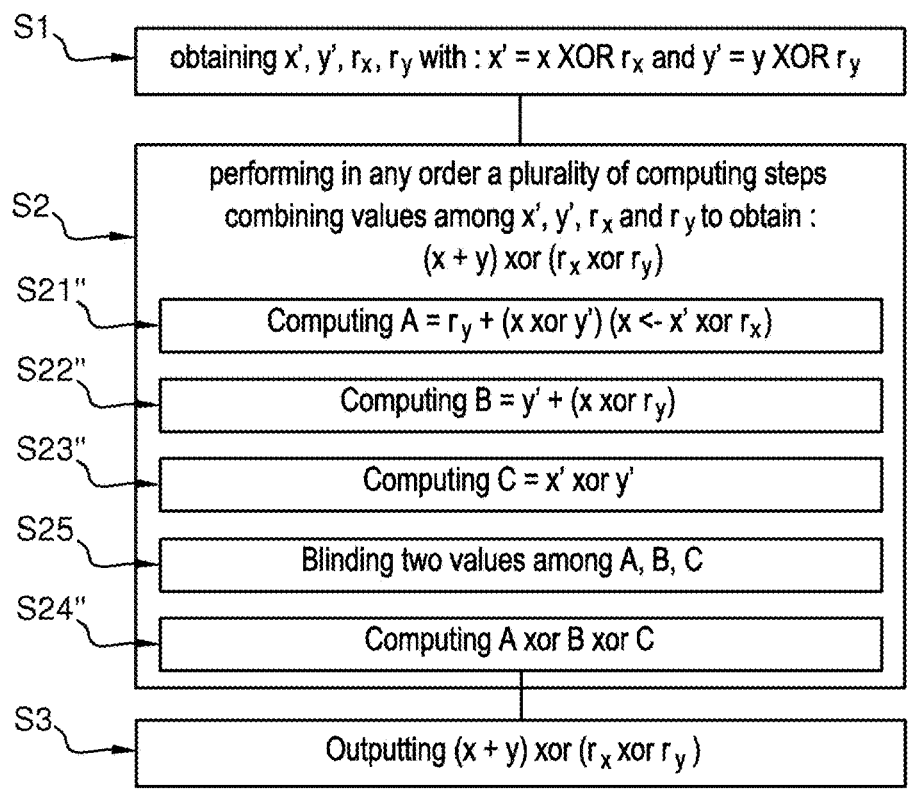

In a third embodiment, as depicted on FIG. 3c, the second step S2 comprises:
- a first computing step S21" during which the cryptographic device computes a first intermediate value A from said second boolean mask $r_y$ and said first value x masked with said second masked value y' as Boolean mask such that A=$r_y$+(x xor y'),
- a second computing step S22" during which the cryptographic device computes a second intermediate value B from said second masked value y' and said first value x masked by said second Boolean mask $r_y$ such that B=y'+(x xor $r_y$),
- a third computing step S23" during which the cryptographic device computes a third intermediate value C from said first masked value x' and said second masked value y' such that C=x' xor y',
- a fourth computing step S24" during which the cryptographic device computes said boolean masked result of the arithmetic operation between said first value x and said second value y by performing a XOR operation between said first, second, and third intermediate values. Said differently, the cryptographic device computes A xor B xor C which is equal to (x+y) xor ($r_x$ xor $r_y$).

In order to avoid manipulating the first value x unmasked, it may be replaced in the formula above by x' xor $r_x$. In order to avoid computing the unmasked first value x at any time, computations may be performed in the following order during the first computing step S21": A=$r_y$+((x' xor y') xor $r_x$) and during the second computing step S22": B=y'+((x' xor $r_y$) xor $r_x$). In that case, in this second embodiment, the Boolean masked result (x+y) xor ($r_x$ xor $r_y$) is also computed, from the values obtained during the first step S1, by performing only nine elementary operations (7 XOR and 2 arithmetic operations), whatever the bit-size of the first and second values, x and y, may be.

In order to increase even more the protection of the method against side channel analysis, two values among the first, second and third intermediate values A, B and C computed during the first, second and third computing steps may be blinded by a random value Rand.

In order to do so, the method may comprise a blinding step S25, during which the cryptographic device arithmetically masks two values among the first, second and third intermediate values by performing an arithmetic operation with the random value Rand.

In the next paragraphs the sign "←" is used to describe value allocation and the first and second intermediate values are the ones arithmetically masked, as an example.

In the first embodiment, the cryptographic device performs:
A←A+Rand, ie finally A=(x' xor $r_y$)+(y' xor $r_x$)+Rand, and
B←B+Rand, ie finally B=(x' xor y')+($r_x$ xor $r_y$)+Rand In the second embodiment, the cryptographic device performs:
A←A+Rand, ie finally A=$r_x$+(y xor x')+Rand, and
B←B+Rand, ie finally B=x'+(y xor $r_x$)+Rand In the third embodiment, the cryptographic device performs:
A←A+Rand, ie finally A=$r_y$+(x xor y')+Rand, and
B←B+Rand, ie finally B=y'+(x xor $r_y$)+Rand In order to be able to obtain the boolean masked result (x+y) xor ($r_x$ xor $r_y$) from the operation A xor B xor C during the fourth computing step, the cryptographic device shall, in addition during the blinding step S25, perform an arithmetic masking to boolean masking conversion of these arithmetically masked intermediate values into Boolean masked intermediate values masked by the random value Rand. Such a conversion may be performed using a conversion function CONV.

Said differently, the cryptographic device shall turn values A+Rand and B+Rand into A xor Rand and B xor Rand.

In the first embodiment, the cryptographic device performs:
A←CONV(A), ie finally A=(x' xor $r_y$)+(y' xor $r_x$) xor Rand, and
B←CONV(B), ie finally B=(x' xor y')+($r_x$ xor $r_y$) xor Rand In the second embodiment, the cryptographic device performs:
A←CONV(A), ie finally A=$r_x$+(y xor x') xor Rand, and
B←CONV(B), ie finally B=x'+(y xor $r_x$) xor Rand In the third embodiment, the cryptographic device performs:
A←CONV(A), ie finally A=$r_y$+(x xor y') xor Rand, and
B←CONV(B), ie finally B=y'+(x xor $r_y$) xor Rand.

By doing so, when performing A xor B xor C in the fourth computing step, Boolean masking of A and B by Rand cancel each other and the operation provides the boolean masked result (x+y) xor ($r_x$ xor $r_y$) as expected.

The conversion function CONV may be a precomputed Look-Up Table. But such a precomputed LUT performing a masking conversion may become very large as the bit-size k of the first and second intermediate values A and B, and of the first and second values x and y, increases.

It is possible to perform such a conversion using a precomputed LUT T of limited size when the bit-size k of the first and second values x and y is a multiple of another lower integer value: k=m*s. In that case the random value may be chosen as the result of concatenating m times another random value mini-rand of size s:
Rand=mini-rand|mini-rand| . . . |mini-rand m times.

Then, masking conversion of A+Rand or B+Rand may be performed by processing in parallel chunks of size s. The values to be converted may be sliced in chuncks of such a size s and each chunck may be converted by applying a conversion LUT T converting an input value of size s arithmetically masked by mini-rand into the same value Boolean masked by mini-rand: T(Z+mini-rand)=Z xor mini-rand for any value Z of size s.

An example is given here of the conversion of the first intermediate value A. After blinding this value with the random value Rand, the first intermediate value is under the form A=D+Rand, the actual value of D depending on the embodiment.

By slicing it into chuncks $A_i$, $D_i$ of size s, A and D may be written
A=$A_{m-1}$|$A_{m-2}$| . . . |$A_1$|$A_0$ and D=$D_{m-1}$|$D_{m-2}$| . . . |$D_1$|$D_0$
With $A_i$=$D_i$+mini-rand+$c_i$
With $c_0$=0
and $c_i$ the carry from the previous chunck$_{i-1}$ for i>0:
$c_i$=1 if $A_{i-1}$<mini-rand
$c_i$=0 if $A_{i-1}$>=mini-rand The result of the masking conversion to be obtained is D xor Rand=$D_{m-1}$ xor mini-rand|$D_{m-2}$ xor mini-rand| . . . |$D_1$ xor mini-rand|$D_0$ xor mini-rand.

In order to obtain such a result, the blinding step S25 may include computing a concatenation of the values equal to T($A_i$−$c_i$) with 0<=i<m.

Indeed T($A_i$−$c_i$)=T($D_i$+mini-rand)=$D_i$ xor mini-rand

An example of implementation of the first embodiment is now given in which the length of the first and second values is 32 bits, the mini-rand r is 8 bit long.

In this implementation, the second step S2 comprises the following computations, using the same notations as above:
1. C x'←xor y'
2. E←$r_x$ xor $r_y$
3. F←C+Rand
4. B←E+F B being arithmetically masked by Rand
5. $c_0$←0
6. From i from 0 to m−1
 a. $D_{Bi}$←T($B_i$−$c_i$ mod $2^{k/m}$)
 b. If $B_i$<mini-rand, then $c_{i+1}$=1
 c. else if $B_i$>mini-rand, $c_{i+1}$=0
7. G←C xor $D_B$ with $D_B$=$D_{B\ m-1}$|$D_{B\ m-2}$| . . . |$D_{B\ 1}$|$D_{B\ 0}$
8. H←$r_x$ xor y'
9. L←$r_y$ xor x'
10. M←H+Rand
11. A←L+M A being arithmetically masked by Rand
12. $c_0$←0
13. From i from 0 to m−1
 a. $D_{Ai}$←T($A_i$−$c_i$ mod $2^{k/m}$)
 b. If $A_i$<mini-rand, then $c_{i+1}$=1
 c. else if $A_i$>mini-rand, $c_{i+1}$=0
14. R←$D_A$ xor G with $D_A$=$D_{A\ m-1}$|$D_{A\ m-2}$| . . . |$D_{A\ 1}$|$D_{A\ 0}$
15. Return(R)

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a non-transitory computer readable medium storing executable computer code that when executed by a cryptographic device comprising a processing system having at least one hardware processor performs the methods according to the first aspect.

According to a fourth aspect, this invention therefore relates also to a cryptographic device 101 comprising:
a processing system having at least one hardware processor 201 configured to perform the steps of the methods according to the first aspect,
at least one memory for storing the first and second masked values and the results of the calculations performed during the different computing steps.

The invention claimed is:

1. A method secured against side channel attacks performing an arithmetic operation of a cryptographic algorithm mixing Boolean and arithmetic operations,
wherein said method is performed by a cryptographic device (101) comprising a processing system (201) having at least one hardware processor, and said operation has a first value (x) and a second value (y) as operands, wherein computing steps performing said arithmetic operation being a mix of Boolean and arithmetic operations between said first value (x) and said second value (y) are performed without directly operating on the first value (x) and the second value (y) and therefore not being susceptible to revealing information concerning the first value (x) or the second value (y), the method comprising:
obtaining (S1) a first masked value (x'), a second masked value (y'), a first Boolean mask ($r_x$), a second Boolean mask ($r_y$), said first masked value (x') resulting from masking said first value (x) by said first Boolean mask ($r_x$) by performing a Boolean exclusive OR (XOR) operation between said first value (x) and said first Boolean mask ($r_x$), and said second masked value (y') resulting from masking said second value (y) by said second Boolean mask ($r_y$) by performing a Boolean exclusive OR (XOR) operation between said second value (y) and said second Boolean mask ($r_y$),
performing (S2) in any order a plurality of computing steps combining values among said first masked value (x'), said second masked value (y'), said first Boolean mask ($r_x$) and said second Boolean mask ($r_y$) to obtain a boolean masked result equal to the result of the arithmetic operation having said first value (x) and said second value (y) as operands, masked by a third boolean mask ($r_x$ xor $r_y$) resulting from performing said Boolean exclusive OR (XOR) operation between said first Boolean mask ($r_x$) and said second Boolean mask ($r_y$) ((x+y) xor ($r_x$ xor $r_y$)),
wherein said computing steps comprise a constant number of elementary operations whatever the bit-size of said first and second values,
outputting (S3) said boolean masked result of the arithmetic operation between said first value (x) and said second value (y).

2. The method of claim 1, wherein each computing step (S2) combines a plurality of values among: said first masked value (x'), said second masked value (y'), said first value (x) masked by said second Boolean mask ($r_y$), said second value (y) masked by said first Boolean mask ($r_x$), said first value (x) masked with said second masked value (y') as Boolean mask, said second value (y) masked with said first masked value (x') as Boolean mask, said first boolean mask ($r_x$), and said second boolean mask ($r_y$).

3. The method of claim 2, wherein said computing steps (S2) comprise:
a first computing step (S21) computing a first intermediate value A from said first masked value x', said second boolean mask $r_y$, said second masked value y' and said first boolean mask $r_x$ such that A=(x' xor $r_y$)+(y' xor $r_x$),
a second computing step (S22) computing a second intermediate value B from said first masked value x', said second masked value y', said first boolean mask $r_x$, and said second boolean mask $r_y$ such that B=(x' xor y')+($r_x$ xor $r_y$),
a third computing step (S23) computing a third intermediate value C from said first masked value x', said second masked value y' such that C=x' xor y',
a fourth computing step (S24) computing said boolean masked result of the arithmetic operation between said first value (x) and said second value (y) by performing said boolean exclusive OR (XOR) operation between said first, second, and third intermediate values (A xor B xor C),
wherein "+" is an arithmetic operation among an addition or a substraction modulo $2^k$ with k an integer, and "xor" is said boolean exclusive OR operation.

4. The method of claim 2, wherein said computing steps (S2) comprise:
a first computing step (S21') computing a first intermediate value A from said first boolean mask $r_x$, and said second value y masked with said first masked value x' as Boolean mask such that A=$r_x$+(y xor x'),
a second computing step (S22') computing a second intermediate value B from said first masked value x' and said second value y masked by said first Boolean mask $r_x$ such that B=x'+(y xor $r_x$),
a third computing step (S23') computing a third intermediate value C from said first masked value x' and said second masked value y' such that C=x' xor y',
a fourth computing step (S24') computing said boolean masked result of the arithmetic operation between said first value (x) and said second value (y) by performing said boolean exclusive OR operation between said first, second, and third intermediate values (A xor B xor C),
wherein "+" is an arithmetic operation among an addition or a substraction modulo $2^k$ with k an integer, and "xor" is said boolean exclusive OR operation.

5. The method of claim 2, wherein said computing steps comprise:
a first computing step (S21") computing a first intermediate value A from said second boolean mask $r_y$ and said first value x masked with said second masked value y' as Boolean mask such that A=$r_y$+(x xor y'),
a second computing step (S22") computing a second intermediate value B from said second masked value y' and said first value x masked by said second Boolean mask $r_y$ such that B=y'+(x xor $r_y$),
a third computing step (S23") computing a third intermediate value C from said first masked value x' and said second masked value y' such that C=x' xor y',
a fourth computing step (S24") computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a substraction modulo 2^k with k an integer, and "xor" is said Boolean exclusive OR operation.

6. The method of claim 1, comprising blinding (S25) two values among the first, second and third intermediate values (A, B, C) computed during said first, second and third computing steps using a random value (rand).

7. The method of claim 6, wherein the step of blinding an intermediate value comprises:
arithmetically masking said intermediate value by performing an arithmetic operation with said random value (rand)
and performing an arithmetic masking to boolean masking conversion of said arithmetically masked intermediate value into a Boolean masked intermediate value masked by the random value using a precomputed table.

8. The method of claim 1, wherein the cryptographic algorithm performs functions among a hash function, a block cipher and a stream cipher.

9. The method of claim 8, wherein the hash function is among MD5, SHA1, SHA256, SHA512, Skein functions, the block cipher is among XTEA, FEAL, SPECK, Threefish functions and/or the stream cipher is among Salsa20, Cha-Cha functions.

10. A non-transitory computer readable medium storing executable computer code that when executed by a cryptographic device (101) comprising a processing system (201) having at least one hardware processor performs an operation that has a first value (x) and a second value (y) as operands, wherein computing steps performed by said hardware processor being a mix of Boolean and arithmetic operations between said first value (x) and said second value (y) are performed without directly operating on the first value (x) and the second value (y) and therefore not being susceptible to revealing information concerning the first value (x) or the second value (y), instructions causing the hardware processor to perform the steps:
obtaining (S1) a first masked value (x'), a second masked value (y'), a first Boolean mask ($r_x$), a second Boolean mask ($r_y$),
said first masked value (x') resulting from masking said first value (x) by said first Boolean mask ($r_x$) by performing a Boolean exclusive OR (XOR) operation between said first value (x) and said first Boolean mask ($r_x$),
and said second masked value (y') resulting from masking said second value (y) by said second Boolean mask ($r_y$) by performing a Boolean exclusive OR (XOR) operation between said second value (y) and said second Boolean mask ($r_y$),
performing (S2) in any order a plurality of computing steps combining values among said first masked value (x'), said second masked value (y'), said first Boolean mask ($r_x$) and said second Boolean mask ($r_y$) to obtain a boolean masked result equal to the result of the arithmetic operation having said first value (x) and said second value (y) as operands, masked by a third boolean mask ($r_x$ xor $r_y$) resulting from performing said Boolean exclusive OR (XOR) operation between said first Boolean mask ($r_x$) and said second Boolean mask ($r_y$) ((x+y) xor ($r_x$ xor $r_y$)),
wherein said computing steps comprise a constant number of elementary operations whatever the bit-size of said first and second values,
outputting (S3) said boolean masked result of the arithmetic operation between said first value (x) and said second value (y).

11. Cryptographic device (101) comprising:
a processing system (201) having at least one hardware processor configured to perform an operation that has a first value (x) and a second value (y) as operands, wherein computing steps performed by said hardware processor being a mix of Boolean and arithmetic operations between said first value (x) and said second value (y) are performed without directly operating on the first value (x) and the second value (y) and therefore not being susceptible to revealing information concerning the first value (x) or the second value (y), wherein the hardware processor is configured to perform the steps of:
obtaining (S1) a first masked value (x'), a second masked value (y'), a first Boolean mask ($r_x$), a second Boolean mask ($r_y$),
said first masked value (x') resulting from masking said first value (x) by said first Boolean mask ($r_x$) by performing a Boolean exclusive OR (XOR) operation between said first value (x) and said first Boolean mask ($r_x$),
and said second masked value (y') resulting from masking said second value (y) by said second Boolean mask ($r_y$) by performing a Boolean exclusive OR (XOR) operation between said second value (y) and said second Boolean mask ($r_y$),
performing (S2) in any order a plurality of computing steps combining values among said first masked value (x'), said second masked value (y'), said first Boolean mask ($r_x$) and said second Boolean mask ($r_y$) to obtain a boolean masked result equal to the result of the arithmetic operation having said first value (x) and said second value (y) as operands, masked by a third boolean mask ($r_x$ xor $r_y$) resulting from performing said Boolean exclusive OR (XOR) operation between said first Boolean mask ($r_x$) and said second Boolean mask ($r_y$) ((x+y) xor ($r_x$ xor $r_y$)),
wherein said computing steps comprise a constant number of elementary operations whatever the bit-size of said first and second values,
outputting (S3) said boolean masked result of the arithmetic operation between said first value (x) and said second value (y); and
at least one memory (203, 204, 205) for storing the first and second masked values and the results of the calculations performed during the different computing steps.

12. The non-transitory computer readable medium storing executable computer code of claim 10 wherein each computing step (S2) combines a plurality of values among: said first masked value (x'), said second masked value (y'), said first value (x) masked by said second Boolean mask ($r_y$), said second value (y) masked by said first Boolean mask ($r_x$), said first value (x) masked with said second masked value (y') as Boolean mask, said second value (y) masked with said first masked value (x') as Boolean mask, said first boolean mask ($r_x$), and said second boolean mask ($r_y$).

13. The non-transitory computer readable medium storing executable computer code of claim 10 wherein said computing steps (S2) comprise:
a first computing step (S21) computing a first intermediate value A from said first masked value x', said second boolean mask $r_y$, said second masked value y' and said first boolean mask $r_x$ such that A=(x' xor $r_y$)+(y' xor $r_x$), a second computing step (S22) computing a second intermediate value B from said first masked value x', said second masked value y', said first boolean mask $r_x$, and said second boolean mask $r_y$ such that B=(x' xor y')+($r_x$ xor $r_y$), a third computing step (S23) computing a third intermediate value C from said first masked value x', said second masked value y' such that C=x' xor y', a fourth computing step (S24) computing said boolean masked result of the arithmetic operation between said first value (x) and said second value (y) by performing said boolean exclusive OR (XOR) operation between said first, second, and third intermediate values (A xor B xor C), wherein "+" is an arithmetic operation among an addition or a substraction modulo 2^k with k an integer, and "xor" is said boolean exclusive OR operation.

14. The non-transitory computer readable medium storing executable computer code of claim 10 wherein said computing steps (S2) comprise:

a first computing step (S21') computing a first intermediate value A from said first boolean mask $r_x$, and said second value y masked with said first masked value x' as Boolean mask such that A=$r_x$+(y xor x'), a second computing step (S22') computing a second intermediate value B from said first masked value x' and said second value y masked by said first Boolean mask $r_x$ such that B=x'+(y xor $r_x$), a third computing step (S23') computing a third intermediate value C from said first masked value x' and said second masked value y' such that C=x' xor y', a fourth computing step (S24') computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a substraction modulo 2^k with k an integer, and "xor" is said boolean exclusive OR operation.

15. The non-transitory computer readable medium storing executable computer code of claim 10 wherein said computing steps comprise:

a first computing step (S21") computing a first intermediate value A from said second boolean mask $r_y$ and said first value x masked with said second masked value y' as Boolean mask such that A=$r_y$+(x xor y'), a second computing step (S22") computing a second intermediate value B from said second masked value y' and said first value x masked by said second Boolean mask $r_y$ such that B=y'+(x xor $r_y$), a third computing step (S23") computing a third intermediate value C from said first masked value x' and said second masked value y' such that C=x' xor y', a fourth computing step (S24") computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a substraction modulo 2^k with k an integer, and "xor" is said Boolean exclusive OR operation.

16. The non-transitory computer readable medium storing executable computer code of claim 10, wherein the executable computer code further causes the hardware processor to perform a step of blinding (S25) two values among the first, second and third intermediate values (A, B, C) computed during said first, second and third computing steps using a random value (rand).

17. The non-transitory computer readable medium storing executable computer code of claim 16 wherein the step of blinding an intermediate value comprises:

arithmetically masking said intermediate value by performing an arithmetic operation with said random value (rand)

and performing an arithmetic masking to boolean masking conversion of said arithmetically masked intermediate value into a Boolean masked intermediate value masked by the random value using a precomputed table.

18. The non-transitory computer readable medium storing executable computer code of claim 10 wherein the cryptographic algorithm performs functions among a hash function, a block cipher and a stream cipher.

19. The non-transitory computer readable medium storing executable computer code of claim 10 wherein the hash function is among MD5, SHA1, SHA256, SHA512, Skein functions, the block cipher is among XTEA, FEAL, SPECK, Threefish functions and/or the stream cipher is among Salsa20, ChaCha functions.

20. The cryptographic device of claim 11 wherein each computing step (S2) combines a plurality of values among: said first masked value (x'), said second masked value (y'), said first value (x) masked by said second Boolean mask ($r_y$), said second value (y) masked by said first Boolean mask ($r_x$), said first value (x) masked with said second masked value (y') as Boolean mask, said second value (y) masked with said first masked value (x') as Boolean mask, said first boolean mask ($r_x$), and said second boolean mask ($r_y$).

21. The cryptographic device of claim 11 wherein said computing steps (S2) comprise:

a first computing step (S21) computing a first intermediate value A from said first masked value x', said second boolean mask $r_y$, said second masked value y' and said first boolean mask $r_x$ such that A=(x' xor $r_y$)+(y' xor $r_x$), a second computing step (S22) computing a second intermediate value B from said first masked value x', said second masked value y', said first boolean mask $r_x$, and said second boolean mask $r_y$ such that B=(x' xor y')+($r_x$ xor $r_y$), a third computing step (S23) computing a third intermediate value C from said first masked value x', said second masked value y' such that C=x' xor y', a fourth computing step (S24) computing said boolean masked result of the arithmetic operation between said first value (x) and said second value (y) by performing said boolean exclusive OR (XOR) operation between said first, second, and third intermediate values (A xor B xor C), wherein "+" is an arithmetic operation among an addition or a substraction modulo 2^k with k an integer, and "xor" is said boolean exclusive OR operation.

22. The cryptographic device of claim 11 wherein said computing steps (S2) comprise:

a first computing step (S21') computing a first intermediate value A from said first boolean mask $r_x$, and said second value y masked with said first masked value x' as Boolean mask such that A=$r_x$+(y xor x'), a second computing step (S22') computing a second intermediate value B from said first masked value x' and said second value y masked by said first Boolean mask $r_x$ such that B=x'+(y xor $r_x$), a third computing step (S23') computing a third intermediate value C from said first masked value x' and said second masked value y' such that C=x' xor y', a fourth computing step (S24') computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a substraction modulo $2^k$ with k an integer, and "xor" is said boolean exclusive OR operation.

23. The cryptographic device of claim 11 wherein said computing steps comprise:

a first computing step (S21") computing a first intermediate value A from said second boolean mask $r_y$ and said first value x masked with said second masked value y' as Boolean mask such that A=$r_y$+(x xor y'), a second computing step (S22") computing a second intermediate value B from said second masked value y' and said first value x masked by said second Boolean mask $r_y$ such that B=y'+(x xor $r_y$), a third computing step (S23") computing a third intermediate value C from said first masked value x' and said second masked value y' such that C=x' xor y', a fourth computing step (S24") computing said boolean masked result of the arithmetic operation between said first value (x) and said second value (y) by performing said boolean exclusive OR operation between said first, second, and third intermediate values (A xor B xor C), wherein "+" is an arithmetic operation among an addition or a substraction modulo $2^k$ with k an integer, and "xor" is said Boolean exclusive OR operation.

24. The cryptographic device of claim 11, wherein the executable computer code further causes the hardware processor to perform a step of blinding (S25) two values among the first, second and third intermediate values (A, B, C) computed during said first, second and third computing steps using a random value (rand).

25. The non-transitory computer readable medium storing executable computer code of claim 24 wherein the step of blinding an intermediate value comprises:

arithmetically masking said intermediate value by performing an arithmetic operation with said random value (rand)

and performing an arithmetic masking to boolean masking conversion of said arithmetically masked intermediate value into a Boolean masked intermediate value masked by the random value using a precomputed table.

26. The cryptographic device of claim 11 wherein the cryptographic algorithm performs functions among a hash function, a block cipher and a stream cipher.

27. The cryptographic device of claim 11 wherein the hash function is among MD5, SHA1, SHA256, SHA512, Skein functions, the block cipher is among XTEA, FEAL, SPECK, Threefish functions and/or the stream cipher is among Salsa20, ChaCha functions.

* * * * *